(12) United States Patent
Toda et al.

(10) Patent No.: US 7,594,008 B2
(45) Date of Patent: Sep. 22, 2009

(54) SITE MONITORING METHOD AND SITE MONITORING APPARATUS

(75) Inventors: Hiroto Toda, Ota (JP); Makoto Fukaya, Ota (JP); Akio Fujino, Ota (JP)

(73) Assignee: Fujitsu Limited, Kawasaki (JP)

( * ) Notice: Subject to any disclaimer, the term of this patent is extended or adjusted under 35 U.S.C. 154(b) by 712 days.

(21) Appl. No.: 10/330,276

(22) Filed: Dec. 30, 2002

(65) Prior Publication Data
US 2003/0182365 A1 Sep. 25, 2003

(30) Foreign Application Priority Data
Mar. 20, 2002 (JP) .............................. 2002-077807

(51) Int. Cl.
*G06F 15/173* (2006.01)
*G06F 15/16* (2006.01)

(52) U.S. Cl. ....................... 709/224; 709/203

(58) Field of Classification Search ................. 709/224, 709/225, 226, 227, 218, 223, 203, 217, 205, 709/206, 202; 707/102, 103; 705/10
See application file for complete search history.

(56) References Cited

U.S. PATENT DOCUMENTS

| | | | |
|---|---|---|---|
| 6,035,332 A * | 3/2000 | Ingrassia et al. | 709/224 |
| 6,647,381 B1 * | 11/2003 | Li et al. | 707/3 |
| 6,742,030 B1 * | 5/2004 | MacPhail | 709/224 |
| 6,850,975 B1 * | 2/2005 | Danneels et al. | 709/224 |
| 6,901,397 B1 * | 5/2005 | Moldenhauer et al. | 707/3 |
| 6,928,474 B2 * | 8/2005 | Venkatesan | 709/224 |
| 7,080,321 B2 * | 7/2006 | Aleksander et al. | 715/708 |
| 2002/0059181 A1 | 5/2002 | Kohda et al. | |
| 2002/0073206 A1 * | 6/2002 | Jawahar et al. | 709/227 |
| 2004/0034706 A1 * | 2/2004 | Cohen et al. | 709/225 |
| 2004/0088355 A1 * | 5/2004 | Hagan et al. | 709/203 |
| 2007/0094267 A1 * | 4/2007 | Good et al. | 707/10 |

FOREIGN PATENT DOCUMENTS

JP   2002-056027   2/2002

OTHER PUBLICATIONS

Notice of Reason for Rejection issued Jan. 24, 2006 in corresponding Japanese Patent Application No. 2002-077807 (3 pages), Partial English translation (1 page).

* cited by examiner

*Primary Examiner*—Larry D Donaghue
*Assistant Examiner*—Karen C Tang
(74) *Attorney, Agent, or Firm*—Staas & Halsey LLP

(57) ABSTRACT

Disclosed is a site monitoring method executed by a computer that can connect to a client machine. The computer transmits Web data for a Web page included in a Web site to the client machine in response to the request from the client machine and stores information about a displaying history of Web pages into a storage provided with the computer. The computer counts a repeating number for a predetermined Web page as an accumulated repeating number when the information shows that the predetermined Web page is repetitively displayed with intervention of another Web page. The computer judges that a user lost his or her way in the Web site when the accumulated repeating number exceeds a predetermined value. When a user lose his or her way in the Web site, the computer transmits guidance information to the client machine, guiding the user to the desired Web page.

4 Claims, 9 Drawing Sheets

---

You seem to lose your way, don't you?
Goal pages to which you should arrive are estimated according to your losing patterns until now and will be displayed sequentially (5 seconds every page).
If you find the target goal page, please follow guidance displayed on a next page after the target goal page turns off.

FIG. 3

Optimum Access Route Table 11-1

| Page | Design Browsing Time |
|---|---|
| A | 15 seconds |
| B | 10 seconds |
| C | 10 seconds |
| D, E, F | (Goal) |

FIG. 4

Optimum Access Route Table 11-2

| Page | Design Browsing Time |
|---|---|
| A | 15 seconds |
| B | 10 seconds |
| G | 5 seconds |
| H, I, J | (Goal) |

FIG. 5

Optimum Access Route Table 11-3

| Page | Design Browsing Time |
|---|---|
| A | 15 seconds |
| B | 10 seconds |
| K | 10 seconds |
| L, M | (Goal) |

FIG. 6

Optimum Access Route Table 11-4

| Page | Design Browsing Time |
|---|---|
| A | 15 seconds |
| B | 10 seconds |
| N | 15 seconds |
| O, P, Q | (Goal) |

FIG. 7

Optimum Access Route Table 11-5

| Page | Design Browsing Time |
|---|---|
| A | 15 seconds |
| R | 15 seconds |
| S | 15 seconds |
| T, U | (Goal) |

FIG. 8

Access Log 12

| Log Number | Page | Design Browsing Time | Accumulated Repeating Number |
|---|---|---|---|
| 1 | A | 9 seconds | 0 |
| 2 | B | 12 seconds | 0 |
| 3 | A | 10 seconds | 1 |
| 4 | B | 8 second | 0 |
| 5 | K | 5 second | 0 |
| 6 | B | 15 second | 1 |
| 7 | C | 8 second | 0 |
| 8 | B | 5 second | 2 |
| 9 | G | 3 second | 0 |
| 10 | I | 20 second | 0 |

FIG. 9

Arrived Ratio Table 13

| Losing Pattern | | | Goal Page | | | Goal Page | | | Goal Page | | |
|---|---|---|---|---|---|---|---|---|---|---|---|
| Number | Pattern | Total Number | Goal | Arrived Number | Arrived Ratio | Goal | Arrived Number | Arrived Ratio | Goal | Arrived Number | Arrived Ratio |
| 1 | B→K→B→C→B | ... | I | ... | 60% | H | ... | 20% | P | ... | 10% |
| 2 | B→K→B→N→B | ... | D | ... | 40% | F | ... | 20% | J | ... | 15% |

FIG. 11

You seem to lose your way, don't you?
Goal pages to which you should arrive are estimated according to your losing patterns until now and will be displayed sequentially (5 seconds every page).
If you find the target goal page, please follow guidance displayed on a next page after the target goal page turns off.

FIG. 12

Page I

KIBOUGAOKA Special Elderly Nursing Home
-Day Care Application Page-

Principal Name: _____
Applicant: _____
Address: _____
Contact Address: _____
Desired Date and Time: _____
Desired Service: (1) Bathing, (2) Rehabilitation, (3) Recreation

FIG. 13

If the displayed page is your target goal page, please click buttons in the following order.

(1) Click "Back" button
   (2) Click "Select Page G" button
   (3) Click "Select Page I" button Click "Next Candidate Page" button to display a next page.

( Back )   ( Next Candidate Page )

FIG. 14

The shortest route to Page H is

A → B → G → H.

Your followed route is

A → R → S → G → H.

Take the shortest route to access Page H next time and after.

FIG. 15

To Site Manager

Regarding Page having Design Failure
Many users who should arrive at Page I lose their ways in Page B. Page B seems to have design failure.
Click "Next" button to display Page B in which the button that has selected by mistake with the highest ratio and the button that should be selected to arrive at Page I are blinking. It will help you to improve Page B.

( Back )   ( Next )

FIG. 16

Link for Page C
(Blinking)

Select from follows:

(1) Guidance to use Elderly Nursing Home
(2) Vacancy of Elderly Nursing Home
(3) Service in Elderly Nursing Home
(4) List of Elderly Nursing Homes in △△-City ( Back )

Link for Page G
(Blinking)

SITE MONITORING METHOD AND SITE MONITORING APPARATUS

BACKGROUND OF THE INVENTION

1. Field of the Invention

The present invention relates to a site monitoring method for monitoring usability of a Web site.

2. Prior Art

Usability of a Web site has been valued to make a user-friendly Web site. According to a conventional site monitoring method, a person in charge (a tester) accesses a target Web site for valuation. Operations of the tester and screen images varying with the operations are recorded by a video camera. Usability is valued by analyzing the video data.

However, the conventional method requires a tester to value the usability and spends much time and energy to analyze the video data.

SUMMARY OF THE INVENTION

It is therefore an object of the present invention to provide an improved site monitoring method, which is capable of monitoring usability automatically.

A site monitoring method according to the present invention is executed by a computer that can connect to a client machine. The computer transmits Web data for a Web page included in a Web site to the client machine in response to the request from the client machine and stores information about a displaying history of Web pages into a storage provided with the computer. The displaying history on the client machine is equivalent to a transmitting history of the Web data on the computer. The computer counts a repeating number for a predetermined Web page as an accumulated repeating number when the information shows that the predetermined Web page is repetitively displayed with intervention of another Web page. Then the computer judges that a user lost his or her way in the Web site when the accumulated repeating number exceeds a predetermined value.

With this method, the computer is able to detect a user who loses his or her way in the Web site. If many users lose their way in the Web site, it can be determined that the Web site has poor usability.

When a user lose his or her way in the Web site, the computer may transmit guidance information that shows a connection relationship among the Web pages in the Web site to the client machine, guiding the user to the desired Web page.

Further, accumulating the detected information, the usability of the Web site can be evaluated based on the accumulated information and useful information to improve the Web site can be obtained.

For example, the computer may store the information about the displaying history of Web pages with a corresponding goal page that is finally displayed to the storage when a user of the client machine is judged as losing his or her way. Then the computer stores a losing pattern extracted from the information about the displaying history of Web pages with an arrived ratio to each goal page through the losing pattern to the storage. In such a case, a goal page having the most highest arrived ratio corresponding to the losing pattern followed by a user is specified and the information about the specified goal page and guidance information that shows a route to the specified goal page are transmitted.

For another example, the computer may define a displaying history of the Web pages as a losing pattern when a user of the client machine is judged as losing his or her way. In such a case, the computer creates information about the Web page that is repetitively displayed in the losing pattern that is followed by a predetermined number of users and more, informing the created information to a manager of the Web site.

For still another example, the computer may stores the information about the displaying history of Web pages with a corresponding goal page that is finally displayed to the storage when a user of the client machine is judged as losing his or her way. Then the computer stores a losing pattern extracted from the information about the displaying history of Web pages with an arrived ratio to each goal page through the losing pattern to the storage. In such a case, the computer designates a target Web page that is repetitively displayed in the common losing pattern that is followed by a predetermined number of users and more, and designates the goal page corresponding to the losing pattern based on the arrived ratio. The computer creates improvement information that includes a link to a next Web page from the target Web page through the optimum route toward the designated goal page and a link to a next Web page from the target Web page through the route of the common losing pattern. The links are displayed in the target page with emphasis and informs the improvement information to a manager of the Web site.

The above described method is also available as a computer program executed on the server computer.

DESCRIPTION OF THE ACCOMPANYING DRAWINGS

FIGS. 3 through 7 show optimum access route tables;

FIG. 8 is a table showing access log;

FIG. 9 shows a data layout of an arrived ratio table;

FIGS. 11 through 13 show Web pages for guidance;

FIG. 14 shows a Web page to recommend the optimum access route;

FIGS. 15 and 16 show Web pages for warning.

DESCRIPTION OF THE PREFERRED EMBODIMENTS

Figure 1:
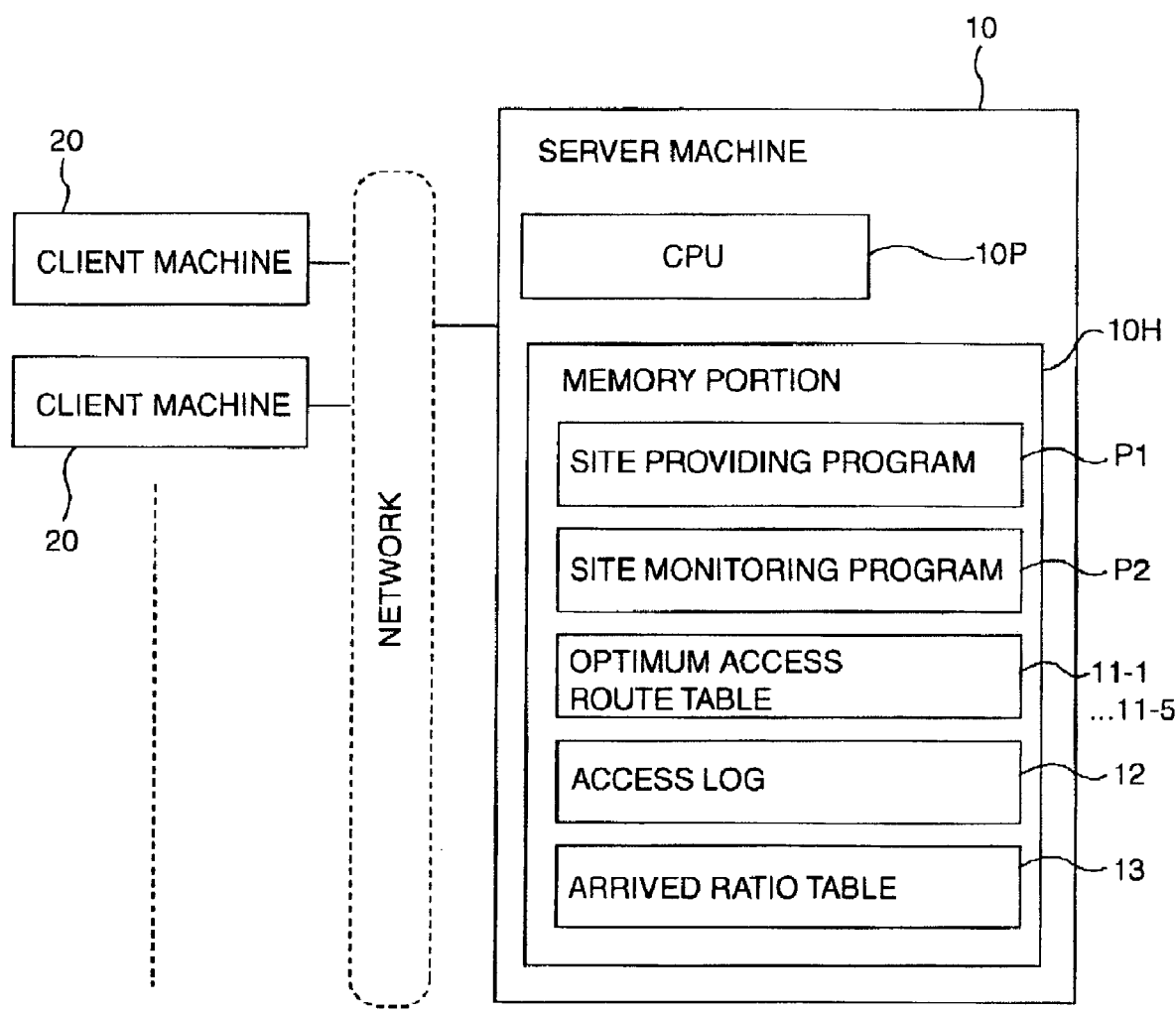
FIG. 1 is a block diagram showing the entire system of a site monitoring system of an embodiment according to the present invention.

An embodiment of the present invention will be described with reference to the drawings. FIG. 1 is a block diagram of the entire system including a server machine. The server machine 10 is a server computer that can connect to client machines 20 through a network like the Internet.

Further the server machine 10 is provided with a CPU 10P and a memory portion (storage) 10H having a hard disk and a memory that are connected to the CPU 10P. A site providing program P1 and a site monitoring program P2 are installed in the memory portion 10H. The site providing program P1 includes a Web server program module that provides a Web site and a server side program module. The site monitoring program P2 monitors the Web site provided by the site providing program P1 to value usability thereof.

For example, the client machine 20 consists of a personal computer in which a Web browser program is installed. A user is able to access a Web site provided by the server machine 10 from the client machine 20.

Figure 2:
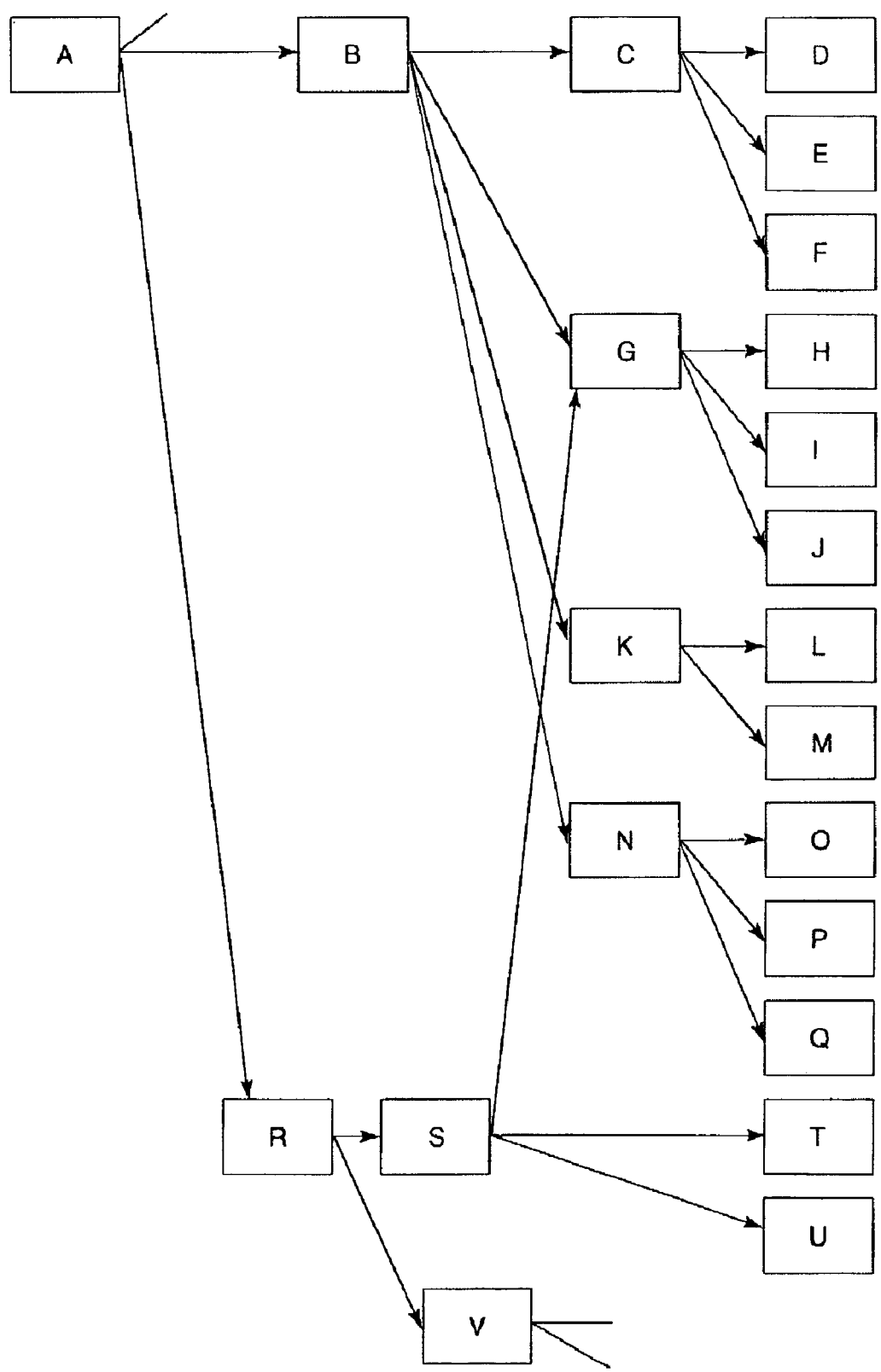
FIG. 2 is a tree diagram showing a construction of a Web site.

FIG. 2 is a tree diagram showing a construction of the Web site provided by the server machine 10. Information of the Web page is stored in the memory portion 10H as a part of the site providing program P1. When a user gives an instruction to the client machine 20 to access the Web site, the information about the instruction is transmitted to the server machine 10. Then the server machine 10 sends information about a page A that is a top page to the client machine 20 based on the information about the instruction. The client machine 20 receives the information send by the server machine 10 and displays the Web page A. The Web page information contains indication marks (links) to go on to a next page. When a user clicks the indicating mark, the next Web page is displayed. Linkage lines in FIG. 2 show next pages available from the current page (link status). That is, a user can display a page B or a page R from the page A. A user can display other pages according to the linkage lines.

Pages D, E, F, H, I, J, L, M, O, P, Q, T and U shown in FIG. 2 are goals in the tree diagram and classified into a group of pages D, E, F, a group of pages H, I, J, a group of pages L, M, a group of pages O, P, Q and a group of pages T, U. FIGS. 3 to 7 show optimum access tables that indicate optimum routs to the goal pages (optimum access routes).

FIG. 3 is an optimum access route table 11-1 showing the optimum access route to the goal pages D, E and F. The optimum access route table 11-1 shows that the optimum access route connects the top page A to the desirable goal pages D, E or F through the intermediate pages B and C in this order.

FIG. 4 is an optimum access route table 11-2 showing the optimum access route to the goal pages H, I and J. The optimum access route table 11-2 shows that the optimum access route connects the top page A to the desirable goal pages H, I or J through the intermediate pages B and G in this order.

FIG. 5 is an optimum access route table 11-3 showing the optimum access route to the goal pages L and M. The optimum access route table 11-4 shows that the optimum access route connects the top page A to the desirable goal pages L or M through the intermediate pages B and K in this order.

FIG. 6 is an optimum access route table 11-4 showing the optimum access route to the goal pages O, P and Q. The optimum access route table 11-4 shows that the optimum access route connects the top page A to the desirable goal pages O, P or Q through the intermediate pages B and N in this order.

FIG. 7 is an optimum access route table 11-5 showing the optimum access route to the goal pages T and U. The optimum access route table 11-5 shows that the optimum access route connects the top page A to the desirable goal pages T or U through the intermediate pages R and S in this order.

Further, "Design Browsing Time" for each page from the top page A to the goal pages is shown in the optimum access route tables 11-1 to 11-5. The "Design Browsing Time" is typical time interval between starting to browse a page and causing a next page to display. The goal pages are defined by a designer and codes representing goal pages are stored in the fields "Design Browsing Time" corresponding to the goal pages. The optimum access route tables 11-1 to 11-5 have been previously stored in the memory portion 10H.

The server machine 10 accumulates access history in the memory portion 10H as an access log 12 according to the site monitoring program P2 when a user accesses the server machine 10 from the client machine 20. FIG. 8 shows a data layout of the access log 12.

The server machine 10 measures time interval between transmitting the information about the top page A to the client machine 20 and transmitting the information about a next page to the client machine 20. The server machine 10 obtains the measured time interval as a "Actual Browsing Time" of the page A. The server machine creates a record whose log number is "1" including "Actual Browsing Time" of the page A and accumulates the created record in the access log 12. In the same manner, the server machine 10 creates a new record with incremental log number for each page transmitted to the client machine 20 and accumulates it in the access log 12.

The access log 12 holds information about "Accumulated Repeating Number". The server machine 10 increments the "Accumulated Repeating Number" when a user goes on to another page from an original page and then returns to the original page without going on to other pages. A default value "0" is stored in each of the "Accumulated Repeating Number" fields whose log numbers are 1 and 2.

After that, the server machine 10 refers to the access log 12 to check whether the current page is identical to the page before the previous page. If these pages are identical, the server machine 10 sets value that is "1" plus the value of the "Accumulated Repeating Number" of the page before the previous page as the "Accumulated Repeating Number" of the current page.

For instance, when a user browses the page A (log number 1), the page R (log number 2) in order and then returns to the page A (log number 3) as shown in FIG. 8, the current page (log number 3) is identical to the page before the previous pages (log number 1). Therefore, the server machine 10 sets the sum of "1" plus "0" that is the value of the "Accumulated Repeating Number" of the page before the previous page (log number 1) as the "Accumulated Repeating Number" of the current page (log number 3). Namely, "1" is set in the "Accumulated Repeating Number" of the current page (log number 3).

Further, when the user goes on to the page B (log number 4), the value of the "Accumulated Repeating Number" (log number 4) is set "0" because the page before the previous page (log number 2) is not the page B. Next, when the user goes on to the page K (log number 5), the value of the "Accumulated Repeating Number" (log number 5) is set "0" because the page before the previous page (log number 3) is not the page K.

Next, when the user goes on to the page B (log number 6), the current page (log number 6) is identical to the page before the previous pages (log number 4). Therefore, the server machine 10 sets the sum of "1" plus "0" that is the value of the "Accumulated Repeating Number" of the page before the previous page (log number 4) to the "Accumulated Repeating Number" of the current page (log number 6). Namely, "1" is set in the "Accumulated Repeating Number" of the current page (log number 6).

Next, when the user goes on to the page C (log number 7), the value of the "Accumulated Repeating Number" (log number 7) is set "0" because the page before the previous page (log number 5) is not the page C.

Next, when the user goes on to the page B (log number 8), the current page (log number 8) is identical to the page before the previous pages (log number 6). Therefore, the server machine 10 sets the sum of "1" plus "1" that is the value of the "Accumulated Repeating Number" of the page before the previous page (log number 6) to the "Accumulated Repeating Number" of the current page (log number 8). Namely, "2" is set in the "Accumulated Repeating Number" of the current page (log number 8).

As described above, when a user goes on from an original page to another page and then returns to the original page, the value of "Accumulated Repeating Number" becomes "1".

When a user repeats such a back-and-fourth operation, the server machine increments the value of "Accumulated Repeating Number" by "1".

At the time when a value of "Accumulated Repeating Number" reaches a predetermined value (for example, "2"), the server machine 10 judges that the user who operates the client machine 20 looses his or her way in the Web site and sends a guidance information to the client machine 20 in accordance with the site monitoring program P2. The client machine 20 receives and displays the guidance information. The user can operate the client machine 20 to arrive at the desired goal page according to the guidance information. In the example of FIG. 8, when the user returns to the page B (log number 8), he or she is judged as losing his or her way. Since the server machine 10 sends the guidance information, the user is able to go on to the page G (log number 9) and to arrive at the desired goal page I (log number 10) according to the guidance information.

An arrived ratio table 13 shown in FIG. 9 is stored in the memory portion 10H of the server machine 10. The arrived ratio table 13 stores information about which goal page the user who lost his or her way in the Web site finally arrived. Specifically, a plurality of patterns of losing way are recorded in fields of "Losing Pattern" in the arrived ratio table 13. Further, the "Total Number" of users who trace the pattern is stored for each pattern and "Arrived Number" and "Arrived Ratio" are stored for each goal page at which a user finally arrived. The "Arrived Ratio" is calculated by dividing the "Arrived Number" at each goal page by the "Total Number" of users who trace the same losing pattern.

The server machine 10 analyzes a losing pattern of a user who arrived at a desired goal page after losing his or her way and updates the arrived ratio table 13.

Hereinafter, a process executed by the server machine 10 according to the programs P1 and P2 will be described with reference to FIG. 10. The process starts when a user accesses the Web site provided by the server machine 10.

At S001, the server machine 10 designates the current log number as "0". Next, the server machine 10 transmits Web data to show a Web page corresponding to a request from the client machine 20 operated by a user (S002). Then the server machine 10 increments the log number by "1" (S003).

At next step S004, the server machine 10 refers to the information about the goal pages stored in the optimum access route tables 11-1 to 11-5 and determines whether the Web page transmitted at S002 is a goal page or not. When the Web page is a goal page (S004, Yes), the server machine 10 causes the process to branch to S013. Otherwise (S004, No), the process goes on to S005.

At S005, the sever machine 10 causes the process to branch in accordance with the current log number. That is, the server machine 10 causes the process to go on to S012 when the current log number is equal to or smaller than "2". If the current log number is larger than "2", the process goes on to S006.

At S006, the server machine 10 refers to the access log 12 (FIG. 8) to specify the record before the previous record.

At next step S007, if the page of the record specified at S006 is the same as the page corresponding to the Web data transmitted at S002 (S007, Yes), the server machine 10 causes the process to go onto S008. Otherwise (S007, No), the process goes on to S012.

At S008, the server machine 10 determines the "Accumulated Repeating Number" of the current record by adding "1" to the "Accumulated Repeating Number" of the record specified at S006 in the access log 12.

Then the server machine 10 causes the process to go on to S010 when the "Accumulated Repeating Number" determined at S008 is equal to or larger than "2" (S009, Yes). The process goes on to S012 otherwise (S009, No).

At S010, the server machine 10 specifies the losing pattern of the user. Specifically, the server machine 10 defines the page four pages earlier as a base point of losing at the time when the "Accumulated Repeating Number" of the current record in the access log 12 reaches "2". Further, the server machine 10 specifies a transmitting history from the base point as a losing pattern.

For instance, if data of the page B, data of the page K, data of the page B, data of the page C and data of the page B are transmitted in this order, the "Accumulated Repeating Number" becomes "2" and the route is stored as a losing pattern.

At next step S011, the server machine 10 creates a Web data of guidance to a user and transmits it to the client machine 20. Specifically, the server machine 10 refers to the arrived ratio table 13 to choose goal pages from the record whose losing pattern is coincident with the losing pattern specified at S010 in order of decreasing arrived ratio. Then the server machine 10 creates a Web data including information about the chosen goal pages and information to guide the routes to the goal pages and sequentially transmits the Web data to the client device 20. The client machine 20 receives the Web data transmitted from the server machine 10 and sequentially displays the Web pages shown in FIGS. 11, 12 and 13 according to the received Web data. A user who watches the Web pages is able to choose a desired goal page and to know the optimum route to the goal page.

The Web page shown in FIG. 11 informs that guidance pages will be displayed in order. The Web page of FIG. 12 shows the goal page with the maximum arrived ratio among the goal pages at which the former users who traced the same losing pattern as the current user arrived. The Web page of FIG. 13 describes the route to the goal page shown in FIG. 12.

At the next step S012, the server machine 10 adds a record corresponding to the current log number to the access log 12 and returns the process to S002. Specifically, the server machine 10 stores the code representing the page corresponding to the Web page transmitted at S002, the elapsed time from when the Web data transmitted at S002 until now and the accumulated repeating number determined at S008 into the fields "Page", "Actual Browsing Time" and "Accumulated Repeating Number" of a new record, respectively. After the server machine 10 stores the new record into the access log 12, it waits until the client machine 20 requests the next page. When the next page is requested, the server machine 10 returns the process to S002.

On the other hand, when the user arrived at a goal page (S004, Yes), the server machine 10 adds a record corresponding to the current log number to the access log 12 at S013 in the same manner as S012.

At the next step S014, the server machine 10 refers to the access log 12 to judge whether a record whose accumulated repeating number is equal to or larger than "2" exists or not. If there is a record that satisfies the condition, the server machine 10 causes the process to go to S015. Otherwise, the server machine 10 finishes the process.

At S015, the server machine 10 updates the arrived ratio table 13 before it finishes the process. Specifically, the server machine 10 increments the "Total Number" corresponding to the losing pattern in the arrived ratio table 13 specified at S010 and increments the "Arrived Number" of the goal page transmitted at S002 in the record corresponding to the specified losing pattern. Further, the server machine 10 updates the arrived ratio table 13 by setting the percentage of the arrived number in the total number to the "Arrived Ratio", finishing the process.

If the access log 12 is not coincident with one of the optimum access routes shown in the optimum access tables 11-1 to 11-5, the server machine 10 may transmit Web data to display a Web page as shown in FIG. 14 that recommends the optimum access route to the client machine 20.

Figure 10:
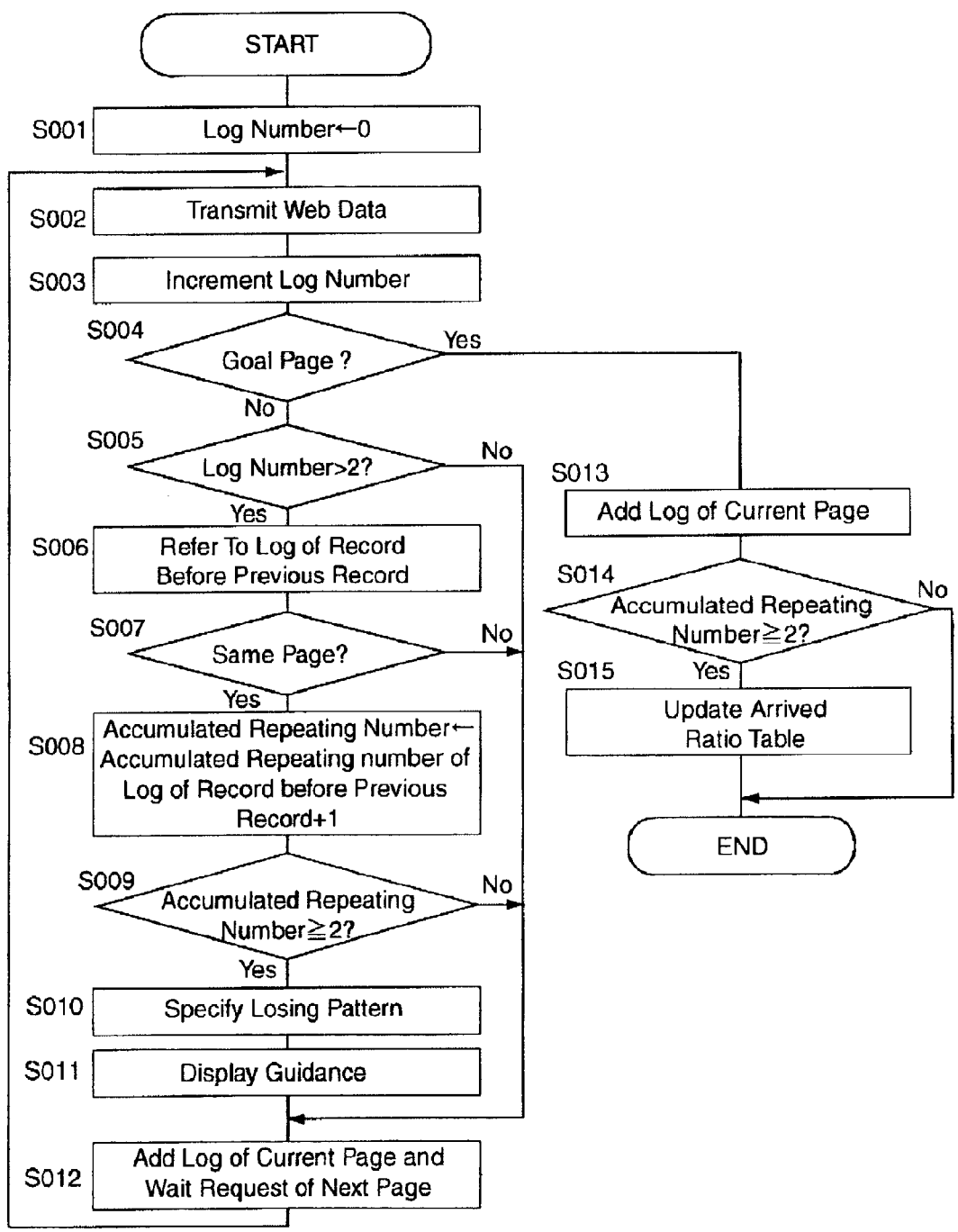
FIG. 10 is a flow chart showing the site monitoring method of the embodiment.

The process shown in FIG. 10 repeats for each user with updating the arrived ratio table 13. When the "Total Number" of the losing pattern in the arrived ratio table 13 exceeds a predetermined value, the server machine 10 warns a manager of the Web site with respect to the losing pattern corresponding to the "Total Number". Specifically, the server machine 10 creates Web data for warning and displays it on the monitor of the server machine 10. The Web data for warning may be send to a computer that is exclusive to the site manager (not shown).

FIGS. 15 and 16 show examples of the Web page based on the Web data for warning. In view of FIG. 15, the site manager recognizes that the page B may have a design failure because many users who should arrive at page I lose their ways in the page B. Then the site manager clicks the "Next" button in FIG. 15 to display a page of FIG. 16 (page B). In the page of FIG. 16, the button for the page C that was selected by mistake with the highest ratio and the button for the page G that should be selected are blinking. The site manager recognizes that the designs of the button for the page G that should be selected and the button for the page C that was selected by mistake with the highest ratio are failed. The site manager checks the page in FIG. 16 to analyze design problems and is able to improve the Web site.

If the actual browsing time exceeds the design browsing time, the server machine 10 warns the site manager by presenting an alarm page. The site manager is able to improve the Web site based on the alarm page.

As described above, the site monitoring method of the present invention automatically detects a user who loses his or her way in a Web site, and usability of the Web site can be automatically evaluated.

What is claimed is:

1. A site monitoring method executed by a computer, the method comprising:
   transmitting Web data for a Web page included in a Web site to a client machine through a network in response to a request from said client machine;
   storing, into a storage, information about a browsing history of a user of said client machine;
   counting a number of repetitive browsing patterns that said user goes on to other Web pages from an original Web page and then returns to said original Web page without going to said other Web pages, as an accumulated repeating number, based on said information stored in said storage;
   specifying, when said accumulated counted repeating number of a repetitive browsing pattern exceeds a predetermined value, said repetitive browsing pattern as a losing pattern;
   storing, into said storage, information about a goal page that is finally displayed with intervention of displaying Web pages corresponding to said specified losing pattern, in correspondence with information about said losing pattern;
   storing, into said storage, an arrived ratio for each goal page in correspondence with said information about said goal pages; and
   transmitting, to said client machine, guidance information that guides said user to a goal page having highest arrived ratio when said accumulated counting repeating number counted in said counting step exceeds a predetermined value.

2. The site monitoring method according to claim 1, further comprising:
   creating information about said Web page that is repetitively displayed in said losing pattern followed together by users more than a predetermined number; and
   informing said information created to a manager of said Web site.

3. The site monitoring method according to claim 1, further comprising:
   designating a target Web page that is repetitively displayed in said losing pattern followed together by said users more than a predetermined number;
   designating the goal page corresponding to said losing pattern based on said arrived ratio;
   creating improvement information that includes a link to a next Web page from said target Web page through an optimum route toward the designated goal page and a link to a next Web page from said target Web page through said losing pattern that are displayed in said target page with emphasis; and
   informing said created improvement information to a manager of said Web site.

4. A site monitoring apparatus comprising:
   a first transmitter that transmits Web data for a Web page included in a Web site to a client machine through a network in response to a request from said client machine;
   a first storage that stores information about a browsing history of a user of said client machine;
   a counter that counts a number of repetitive browsing patterns that said user goes on to other Web pages from an original Web page and then returns to said original Web page without going to the other Web pages, as an accumulated repeating number, based on said information stored in said storage;
   a specifier that specifies, when said accumulated counted repeating number of a repetitive browsing pattern exceeds a predetermined value, said repetitive browsing pattern as a losing pattern;
   a second storage that stores information about a goal page that is finally displayed with intervention of displaying Web pages corresponding to said specified losing pattern in correspondence with information about said losing pattern;
   a third storage that stores an arrived ratio for each goal page in correspondence with said information about said goal pages; and
   a second transmitter that transmits, to said client machine, guidance information that guides said user to a goal page having highest arrived ratio when said accumulated counted repeating number exceeds a predetermined value.

* * * * *